(12) United States Patent
Akada et al.

(10) Patent No.: US 12,224,079 B2
(45) Date of Patent: Feb. 11, 2025

(54) COPPER-COATED STEEL WIRE, SPRING, STRANDED WIRE, INSULATED ELECTRIC WIRE, AND CABLE

(71) Applicant: Sumitomo Electric Industries, Ltd., Osaka (JP)

(72) Inventors: Takumi Akada, Osaka (JP); Daigo Sato, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 349 days.

(21) Appl. No.: 17/616,560

(22) PCT Filed: Jun. 28, 2019

(86) PCT No.: PCT/JP2019/025936
§ 371 (c)(1),
(2) Date: Dec. 3, 2021

(87) PCT Pub. No.: WO2020/261564
PCT Pub. Date: Dec. 30, 2020

(65) Prior Publication Data
US 2022/0238248 A1    Jul. 28, 2022

(51) Int. Cl.
*H01B 1/02*  (2006.01)
*F16F 1/02*  (2006.01)
*H01B 7/00*  (2006.01)
*F16F 1/04*  (2006.01)

(52) U.S. Cl.
CPC .............. *H01B 1/02* (2013.01); *F16F 1/021* (2013.01); *H01B 7/0009* (2013.01); *F16F 1/045* (2013.01); *F16F 2224/0208* (2013.01); *F16F 2228/007* (2013.01)

(58) Field of Classification Search
CPC ... H01B 1/02; H01B 1/04; H01B 1/06; H01B 7/009; H01B 7/18; C23C 18/18; C23C 18/38; C23C 18/42; C23C 18/31; C23C 22/50; F16F 1/021; F16F 1/045
USPC ................. 174/36, 102 R, 106 R, 108, 109, 174/110 R–110 PM, 113 R, 120 R
See application file for complete search history.

(56) References Cited

U.S. PATENT DOCUMENTS

| 6,265,667 | B1 | 7/2001 | Stipes et al. | |
| 2009/0283296 | A1* | 11/2009 | Shimosawa | H01B 11/1826 174/107 |
| 2011/0011639 | A1* | 1/2011 | Visser | H01B 11/1008 174/105 R |

(Continued)

FOREIGN PATENT DOCUMENTS

| CH | 448 199 A | 12/1967 |
| GB | 1089375 A | 11/1967 |
| GB | 1089376 A | 11/1967 |

(Continued)

*Primary Examiner* — William H. Mayo, III
(74) *Attorney, Agent, or Firm* — McCarter & English, LLP; Michael A. Sartori

(57) ABSTRACT

A copper-coated steel wire includes a core wire made of a stainless steel, and a coating layer made of copper or a copper alloy and covering an outer peripheral surface of the core wire. In a cross section perpendicular to a longitudinal direction of the core wire, the outer peripheral surface of the core wire has a value of an arithmetic mean roughness Ra of not less than 25% and not more than 90% of a thickness of the coating layer.

18 Claims, 8 Drawing Sheets

(56) References Cited

U.S. PATENT DOCUMENTS

2016/0340786 A1\* 11/2016 Mukai ................... B32B 15/013
2019/0154096 A1\* 5/2019 Izumida ................. F16F 1/024

FOREIGN PATENT DOCUMENTS

| JP | S62-018771 A | 1/1987 | | |
|---|---|---|---|---|
| JP | H01-289021 A | 11/1989 | | |
| JP | 2002-270039 A | 9/2002 | | |
| WO | 2015/041132 A1 | 3/2015 | | |
| WO | WO-2017212770 A1 \* | 12/2017 | ............. | B21F 35/00 |

\* cited by examiner

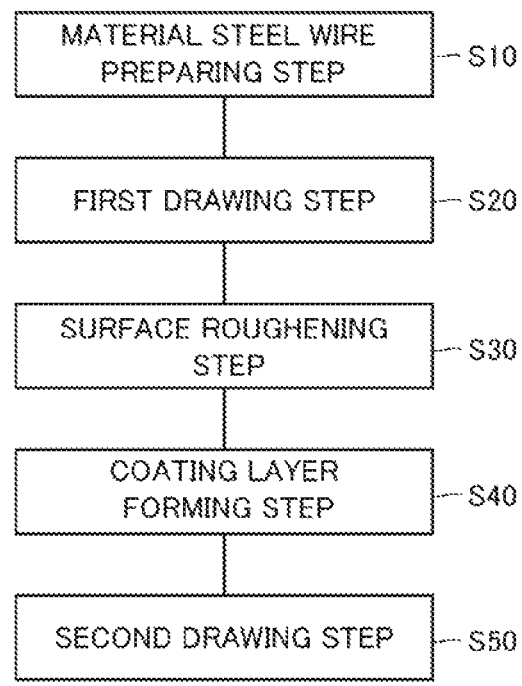
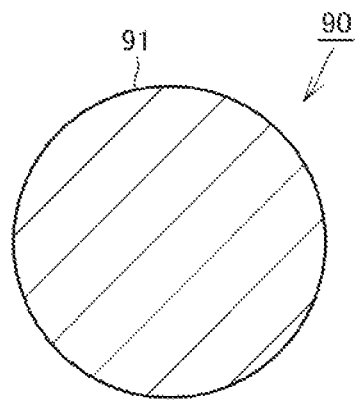

COPPER-COATED STEEL WIRE, SPRING, STRANDED WIRE, INSULATED ELECTRIC WIRE, AND CABLE

TECHNICAL FIELD

The present disclosure relates to a copper-coated steel wire, a spring, a stranded wire, an insulated electric wire, and a cable.

BACKGROUND ART

A copper-coated steel wire, with the surface of a steel material coated with copper, may be adopted in applications where both conductivity and strength are required (see, for example, Patent literatures 1 and 2).

CITATION LIST

Patent Literature

Patent Literature 1: Japanese Patent Application Laid-Open No. 2002-270039
Patent Literature 2: Japanese Patent Application Laid-Open No. H01-289021

SUMMARY OF INVENTION

A copper-coated steel wire according to the present disclosure includes: a core wire made of a stainless steel; and a coating layer made of copper or a copper alloy and covering an outer peripheral surface of the core wire. In a cross section perpendicular to a longitudinal direction of the core wire, the outer peripheral surface of the core wire has a value of an arithmetic mean roughness Ra of not less than 25% and not more than 90% of a thickness of the coating layer.

BRIEF DESCRIPTION OF DRAWINGS

FIG. 2 is a flowchart illustrating an outline of a method of producing a copper-coated steel wire;
FIG. 3 is a schematic cross-sectional view illustrating the method of producing the copper-coated steel wire.

DESCRIPTION OF EMBODIMENTS

Figure 1:
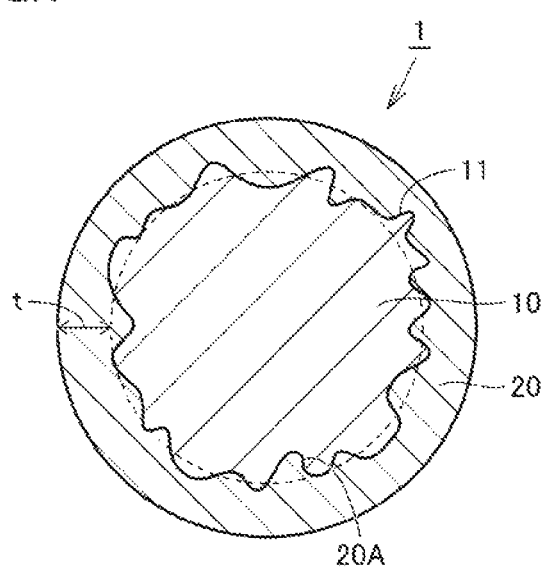
FIG. 1 is a schematic cross-sectional view showing the structure of a copper-coated steel wire in Embodiment 1.

Problems to be Solved by the Present Disclosure

The aforementioned copper-coated steel wire includes a core wire and a coating layer made of copper or a copper alloy. Copper-coated steel wire may be used in applications where stress is applied repeatedly. Such repeatedly applied stress may cause cracking at the interface of the coating layer with the core wire, leading to a decreased conductivity or breakage of the steel wire. In addition, the above copper-coated steel wire is required to suppress the occurrence of corrosion in the core wire.

In view of the foregoing, one of the objects is to provide a copper-coated steel wire which can suppress the occurrence of cracking at the interface of the coating layer with the core wire and also suppress the occurrence of corrosion in the core wire.

Advantageous Effects of the Present Disclosure

According to the copper-coated steel wire of the present disclosure, the occurrence of cracking at the interface of the coating layer with the core wire can be suppressed, and the occurrence of corrosion in the core wire can also be suppressed.

DESCRIPTION OF EMBODIMENTS OF THE PRESENT DISCLOSURE

Firstly, embodiments of the present disclosure will be listed and described. A copper-coated steel wire of the present disclosure includes a core wire made of a stainless steel and a coating layer made of coper or a copper alloy and covering an outer peripheral surface of the core wire. In a cross section perpendicular to a longitudinal direction of the core wire, the outer peripheral surface of the core wire has a value of an arithmetic mean roughness Ra of not less than 25% and not more than 90% of a thickness of the coating layer.

In the copper-coated steel wire of the present disclosure, the core wire made of a stainless steel assures high strength. The coating layer made of copper or a copper alloy ensures excellent conductivity. Further, in a cross section perpendicular to the longitudinal direction of the core wire, the value of Ra of the outer peripheral surface of the core wire is set to be not less than 25% and not more than 90% of the thickness of the coating layer. Protrusions and indentations thus formed on the surface of the core wire increase the bonding strength between the core wire and the coating layer. As a result, the occurrence of cracking at the interface of the coating layer with the core wire can be suppressed. Setting the value of Ra to be not less than 25% of the thickness of the coating layer can reliably improve the bonding strength between the core wire and the coating layer. Setting the value of Ra to be not more than 90% of the thickness of the coating layer can maintain sufficient strength of the core wire. When protrusions and indentations are formed on the surface of the core wire, the interface of the coating layer with the core wire increases in area, leading to an increased possibility of occurrence of corrosion at the dissimilar metal interface of the core wire with the coating layer. The use of the stainless steel as the material constituting the core wire can suppress the occurrence of corrosion at the dissimilar metal interface.

As described above, according to the copper-coated steel wire of the present disclosure, the occurrence of cracking at the interface of the coating layer with the core wire can be suppressed, and the occurrence of corrosion in the core wire can also be suppressed.

In the copper-coated steel wire described above, the outer peripheral surface of the core wire in the cross section perpendicular to the longitudinal direction of the core wire may have a value of a maximum cross-sectional height Rt of not less than 45% and not more than 300% of the thickness of the coating layer. Setting the value of Rt to be not less than 45% of the thickness of the coating layer can more reliably improve the joining strength between the core wire and the coating layer. If the value of Rt exceeds 300% of the thickness of the coating layer, the conductivity of the coating layer may be reduced. Therefore, the value of Rt of not more than 300% of the thickness of the coating layer is preferable.

A copper-coated steel wire of the present disclosure includes: a core wire made of a stainless steel; and a coating layer made of copper or a copper alloy and covering an outer peripheral surface of the core wire. In a cross section perpendicular to a longitudinal direction of the core wire, the outer peripheral surface of the core wire has a value of a maximum cross-sectional height Rt of not less than 45% and not more than 300% of a thickness of the coating layer.

In the copper-coated steel wire of the present disclosure, the value of Rt of the outer peripheral surface of the core wire in the cross section perpendicular to the longitudinal direction of the core wire is set to be not less than 45% and not more than 300% of the thickness of the coating layer. Setting the value of Rt to be not less than 45% of the thickness of the coating layer can reliably improve the bonding strength between the core wire and the coating layer. If the value of Rt exceeds 300% of the thickness of the coating layer, the conductivity of the coating layer may be reduced. Therefore, the value of Rt of not more than 300% of the thickness of the coating layer is preferable. When protrusions and indentations satisfying the above conditions are formed on the surface of the core wire, the area of the interface of the coating layer with the core wire increases, leading to an increased possibility of occurrence of corrosion at the dissimilar metal interface of the core wire with the coating layer. The use of the stainless steel as the material constituting the core wire can suppress the occurrence of corrosion at the dissimilar metal interface. According to the copper-coated steel wire of the present disclosure as well, the occurrence of cracking at the interface of the coating layer with the core wire can be suppressed, and the occurrence of corrosion in the core wire can also be suppressed.

In the copper-coated steel wire of the present disclosure, the steel constituting the core wire may be a ferritic stainless steel. The ferritic stainless steel is a suitable material for constituting the above-described core wire.

In the copper-coated steel wire of the present disclosure, the steel constituting the core wire may be an austenitic stainless steel. The austenitic stainless steel is a suitable material for constituting the above-described core wire.

In the copper-coated steel wire of the present disclosure, the austenitic stainless steel may have a component composition satisfying the following expression (1). The austenitic stainless steel having a component composition satisfying the following expression (1) is a suitable material for constituting the above-described core wire.

$$-400 \geq 1032 - 1667 \times (A+B) - 27.8 \times C - 33 \times D - 61 \times E - 41.7 \times F \quad [\text{Math. 1}]$$

where A represents a carbon content [mass %], B represents a nitrogen content [mass %], C represents a silicon content [mass %], D represents a manganese content [mass %], E represents a nickel content [mass %], and F represents a chromium content [mass %].

In the copper-coated steel wire of the present disclosure, the coating layer may include an alloy layer disposed in a region including an interface with the core wire, the alloy layer containing an alloy of nickel and a metallic element contained in the steel constituting the core wire. The formation of such an alloy layer can increase the bonding force between the core wire and the coating layer and more reliably suppress the occurrence of cracking at the interface of the coating layer with the core wire.

The copper-coated steel wire of the present disclosure may have a tensile strength of not less than 300 MPa and not more than 3400 MPa. With the tensile strength set to be 300 MPa or more, sufficient strength can be obtained. With the tensile strength set to be 3400 MPa or less, sufficient workability can be ensured.

The copper-coated steel wire of the present disclosure may further include a surface layer disposed to include a surface of the copper-coated steel wire, the surface layer including at least one selected from the group consisting of a gold layer, a silver layer, a tin layer, a palladium layer, a nickel layer, and an alloy layer of these metals. Such a configuration improves the corrosion resistance, solderability, and conductivity on the surface of the copper-coated steel wire.

A spring of the present disclosure is made of the copper-coated steel wire described above. According to the spring of the present disclosure, with it being made of the above-described copper-coated steel wire, the occurrence of cracking at the interface of the coating layer with the core wire can be suppressed, and the occurrence of corrosion in the core wire can also be suppressed. It is therefore possible to provide a spring having excellent durability.

A stranded wire of the present disclosure is composed of a plurality of the above-described copper-coated steel wires twisted together. According to the stranded wire of the present disclosure, with it having the structure of the above-described copper-coated steel wires twisted together, the occurrence of cracking at the interface of the coating layer with the core wire can be suppressed, and the occurrence of corrosion in the core wire can also be suppressed. It is therefore possible to provide a stranded wire having excellent durability.

An insulated electric wire of the present disclosure includes: the above-described copper-coated steel wire or the above-described stranded wire; and an insulating layer disposed to cover an outer periphery of the copper-coated steel wire or the stranded wire. According to the insulated electric wire of the present disclosure, with it including the above-described copper-coated steel wire or the above-described stranded wire, the occurrence of cracking at the interface of the coating layer with the core wire can be suppressed, and the occurrence of corrosion in the core wire can also be suppressed. It is therefore possible to provide an insulated electric wire having excellent durability.

A cable of the present disclosure includes: a conductor portion of a wire shape; an insulating layer disposed to cover an outer peripheral surface of the conductor portion; and a shielding portion disposed to surround an outer peripheral surface of the insulating layer. The shielding portion includes a plurality of the above-described copper-coated steel wires. According to the cable of the present disclosure, with the shielding portion including the plurality of the above-described copper-coated steel wires, the durability of the shielding portion can be improved.

A cable of the present disclosure includes: the above-described copper-coated steel wire or the above-described stranded wire; an insulating layer disposed to cover an outer periphery of the copper-coated steel wire or the stranded wire; and a shielding portion disposed to surround an outer peripheral surface of the insulating layer. According to the cable of the present disclosure, with it including the above-described copper-coated steel wire or the above-described stranded wire, the occurrence of cracking at the interface of the coating layer with the core wire can be suppressed, and the occurrence of corrosion in the core wire can also be suppressed. It is therefore possible to provide a cable having excellent durability.

In the above-described cable, the shielding portion may include a plurality of the above-described copper-coated steel wires. With the shielding portion including the plurality of the above-described copper-coated steel wires, the durability of the shielding portion can be improved.

Details of Embodiments of the Present Disclosure

Embodiments of a copper-coated steel wire according to the present disclosure will be described below with reference to the drawings. In the following drawings, the same or corresponding parts are denoted by the same reference numerals, and the descriptions thereof will not be repeated.

Embodiment 1

FIG. 1 is a cross-sectional view perpendicular to the longitudinal direction of a core. Referring to FIG. 1, a copper-coated steel wire 1 in the present embodiment includes a core wire 10 and a coating layer 20. The core wire 10 is made of a stainless steel. The coating layer 20 covers an outer peripheral surface 11 of the core wire 10. The coating layer 20 is made of copper or a copper alloy. The copper-coated steel wire 1 has a circular cross section perpendicular to the longitudinal direction thereof.

In the present embodiment, the stainless steel constituting the core wire 10 is an austenitic stainless steel. The austenitic stainless steel in the present embodiment has a component composition that satisfies the following expression (1). The stainless steel constituting the core wire 10 in the present embodiment is, for example, SUS 304 specified in JIS standard.

$$-400 \geq 1032 - 1667 \times (A-+B) - 27.8 \times C - 33 \times D - 61 \times E - 41.7 \times F$$ [Math. 1]

where A represents a carbon content [mass %], B represents a nitrogen content [mass %], C represents a silicon content [mass %], D represents a manganese content [mass %], E represents a nickel content [mass %], and F represents a chromium content [mass %].

In the cross section perpendicular to the longitudinal direction, the outer peripheral surface 11 of the core wire 10 has a value of the arithmetic mean roughness Ra of not less than 25% and not more than 90% of a thickness t of the coating layer 20. The value of Ra of the outer peripheral surface 11 of the core wire 10 is preferably not less than 27% and not more than 75%, and more preferably not less than 30% and not more than 60%. Here, for measuring the Ra, the following method, for example, is carried out. Firstly, a sample is taken from the copper-coated steel wire 1. Next, a cross section perpendicular to the longitudinal direction of the obtained sample is polished. Then, the interface of the core wire 10 with the coating layer 20 in the polished surface is observed to derive the Ra of the outer peripheral surface 11 of the core wire 10. The Ra is determined, in accordance with JIS B 0601:2013, by measuring the entire outer peripheral surface 11 of the core wire 10. The thickness t of the coating layer 20 can be determined in the following manner. Firstly, the area of the core wire 10 in the cross section perpendicular to the longitudinal direction is measured. Next, for a circle (indicated by the broken line in FIG. 1) corresponding to the obtained area, its radius (equivalent circle radius) is calculated. Then, the difference between the radius of the copper-coated steel wire 1 and the equivalent circle radius of the core wire 10 is regarded as the thickness t of the coating layer 20.

In the present embodiment, in the cross section perpendicular to the longitudinal direction, the outer peripheral surface 11 of the core wire 10 has a value of the maximum cross-sectional height Rt of not less than 45% and not more than 300% of the thickness t of the coating layer 20. The value of Rt of the outer peripheral surface 11 of the core wire 10 is preferably not less than 50% and not more than 250%, and more preferably not less than 100% and not more than 200%. Here, for measuring the Rt, the following method, for example, is carried out. Firstly, a sample is taken from the copper-coated steel wire 1. Next, a cross section perpendicular to the longitudinal direction of the obtained sample is polished. Then, the interface of the core wire 10 with the coating layer 20 in the polished surface is observed to derive the Rt of the outer peripheral surface 11 of the core wire 10. The Rt is determined, in accordance with JIS B 0601:2013, by measuring the entire outer peripheral surface 11 of the core wire 10.

An exemplary method of producing the copper-coated steel wire 1 will now be described. FIG. 3 is a cross-sectional view of a material steel wire in its cross section perpendicular to the longitudinal direction. Referring to FIG. 2, in the method of producing the copper-coated steel wire 1 of the present embodiment, firstly, a material steel wire preparing step is conducted as a step S10. In this step S10, referring to FIG. 3, a material steel wire 90 to be the core wire 10 is prepared. In the present embodiment, the steel constituting the material steel wire 90 is SUS 304.

Figure 4:
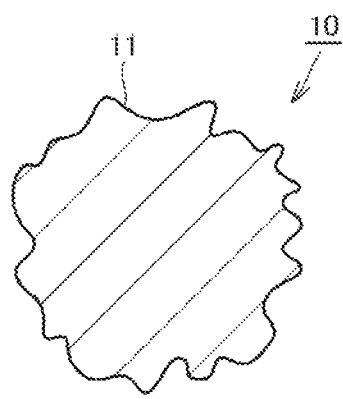
FIG. 4 is a schematic cross-sectional view illustrating the method of producing the copper-coated steel wire.

Next, referring to FIG. 2, a first drawing step is conducted as a step S20. In this step S20, the material steel wire prepared in step S10 is subjected to drawing. Next, referring to FIG. 2, a surface roughening step is conducted as a step S30. In this step S30, the material steel wire 90 that has undergone drawing in step S20 is subjected to a surface roughening process to increase the surface roughness. Specifically, referring to FIG. 3, the material steel wire 90 has its surface 91 brought into contact with an acid such as hydrochloric acid or sulfuric acid for increasing the surface roughness. For example, hydrochloric acid with a concentration of 35% can be used. The concentration of sulfuric acid can be, for example, 65%. In the process of producing a steel wire, a pickling process may be carried out for the purpose of cleaning the surface of the steel wire or removing the oxide coating. However, the surface roughening process in the step S30 differs from the general pickling process in that a highly concentrated acid or a highly corrosive acid is used, or the time of contact with the acid is increased, to achieve the surface roughening. The arithmetic mean roughness Ra at this point in time can be 0.8 μm or more, for example. The surface roughening process may include, instead of or in addition to the process of making the wire surface contact the acid, a process of mechanically achieving the surface roughening by, for example, pressing a polishing non-woven fabric against the surface 91 of the material steel wire 90 and moving the fabric relative to the surface. In this manner, referring to FIG. 4, the core wire 10 in the present embodiment having protrusions and indentations formed on the outer peripheral surface 11 is obtained.

Figure 5:
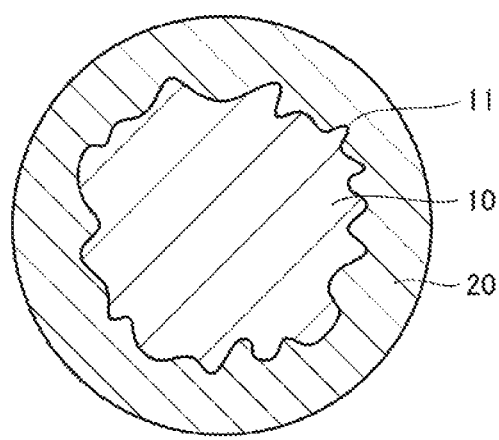
FIG. 5 is a schematic cross-sectional view illustrating the method of producing the copper-coated steel wire.

Next, referring to FIG. 2, a coating layer forming step is conducted as a step S40. In this step S40, referring to FIGS. 4 and 5, a coating layer 20 made of copper or a copper alloy is formed to cover the outer peripheral surface 11 of the core wire 10 that has undergone the surface roughening process in step S30. The coating layer 20 formed in the step S40 has a thickness of, for example, not less than 30 μm and not more than 90 μm. The coating layer 20 may be formed by plating, for example, or may be formed as a cladding layer, which is obtained by separately preparing a member to be the coating layer 20 and mechanically integrating the member with the core wire 10.

Next, referring to FIG. 2, a second drawing step is conducted as a step S50. In this step S50, referring to FIG. 5, the core wire 10 with the coating layer 20 formed thereon in step S40 is subjected to drawing. With this, a copper-coated steel wire 1 having a desired wire diameter is obtained. The degree of working (reduction of area) and the true strain in step S50 can be, for example, 90% or more and 2.3 or more, respectively. The above procedure completes the production of the copper-coated steel wire 1 in the present embodiment.

Here, in the copper-coated steel wire 1 in the present embodiment, the value of Ra of the outer peripheral surface 11 of the core wire 10 in a cross section perpendicular to the longitudinal direction of the core wire 10 is set to be not less than 25% and not more than 90% of the thickness of the coating layer 20. Setting the value of Ra to be not less than 25% of the thickness of the coating layer 20 reliably improves the bonding strength between the core wire 10 and the coating layer 20. Setting the value of Ra to be not more than 90% of the thickness of the coating layer 20 can maintain sufficient strength of the core wire 10. When protrusions and indentations are formed on the outer peripheral surface 11 of the core wire 10, an interface 20A (see FIG. 1) of the coating layer 20 with the core wire 10 increases in area, leading to an increased possibility of the occurrence of corrosion at the dissimilar metal interface of the core wire 10 with the coating layer 20. The use of a stainless steel as the material constituting the core wire 10 can suppress the occurrence of corrosion at the dissimilar metal interface. As described above, according to the copper-coated steel wire 1 in the present embodiment, the occurrence of cracking at the interface 20A of the coating layer 20 with the core wire 10 can be suppressed, and the occurrence of corrosion in the core wire 10 can also be suppressed.

In the above embodiment, the value of Rt of the outer peripheral surface 11 of the core wire 10 in the cross section perpendicular to the longitudinal direction of the core wire 10 is not less than 45% and not more than 300% of the thickness of the coating layer 20. Although it is not essential to set the value of Rt within the above-described range, setting the value of Rt to be not less than 45% of the thickness of the coating layer 20 can more reliably improve the joining strength between the core wire 10 and the coating layer 20. If the value of Rt exceeds 300% of the thickness of the coating layer 20, the conductivity of the coating layer 20 may be reduced. Therefore, the value of Rt of not more than 300% of the thickness of the coating layer 20 is preferable.

In the above embodiment, the description was made of the case where, in a cross section perpendicular to the longitudinal direction of the core wire 10, the value of Ra of the outer peripheral surface 11 of the core wire 10 is not less than 25% and not more than 90% of the thickness of the coating layer 20 and the value of Rt of the outer peripheral surface 11 of the core wire 10 is not less than 45% and not more than 300% of the thickness of the coating layer 20. However, the configuration is not limited to the above case; only one of the values of Ra and Rt may be set to fall within the above-described range. When protrusions and indentations satisfying the above conditions are formed on the surface of the core wire, the area of the interface 20A of the coating layer 20 with the core wire 10 increases, leading to an increased possibility of the occurrence of corrosion at the dissimilar metal interface of the core wire 10 with the coating layer 20. The use of a stainless steel as the material constituting the core wire can suppress the occurrence of corrosion at the dissimilar metal interface. With such a copper-coated steel wire 1 as well, the occurrence of cracking at the interface 20A of the coating layer 20 with the core wire 10 can be suppressed, and the occurrence of corrosion in the core wire 10 can also be suppressed.

In the above embodiment, the description was made of the case where the steel constituting the core wire 10 is an austenitic stainless steel. However, not limited thereto, the steel constituting the core wire 10 may be a ferritic stainless steel.

In the copper-coated steel wire 1 of the above embodiment, the tensile strength may be not less than 300 MPa and not more than 3400 MPa. With the tensile strength set to be 300 MPa or more, sufficient strength can be obtained. With the tensile strength set to be 3400 MPa or less, sufficient workability can be ensured. The tensile strength is measured, for example, in accordance with JIS Z 2241.

In the copper-coated steel wire 1 of the above embodiment, the electrical conductivity may be not less than 5% IACS and not more than 80% IACS, where IACS is an abbreviation for International Annealed Copper Standard. This ensures sufficient conductivity in various applications.

Figure 6:
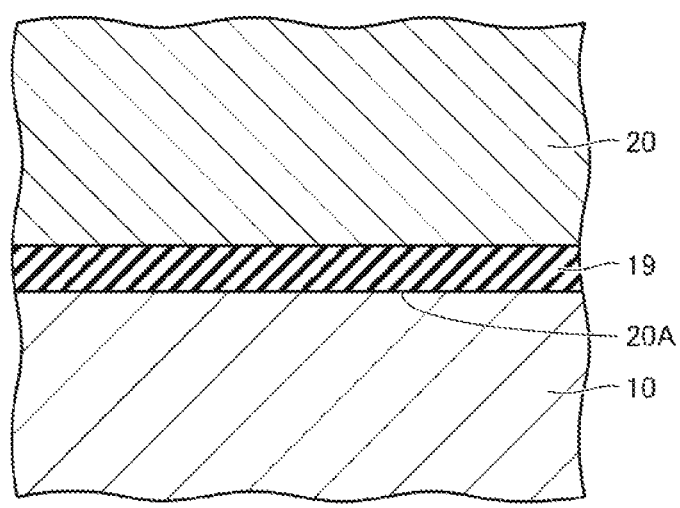
FIG. 6 is a schematic cross-sectional view showing a first modification of the copper-coated steel wire in Embodiment 1.

Now, a first modification of the copper-coated steel wire 1 in Embodiment 1 will be described. FIG. 6 is an enlarged view of the vicinity of the interface 20A of the coating layer 20 with the core wire 10 in a cross section perpendicular to the longitudinal direction of the core wire 10. Referring to FIG. 6, the coating layer 20 in the present modification includes an alloy layer 19 disposed in a region including the interface 20A with the core wire 10. The alloy layer 19 includes an alloy of nickel and a metallic element contained in the steel constituting the core wire 10. Although the presence of the alloy layer 19 is not essential in the copper-coated steel wire of the present application, the formation of the alloy layer 19 can increase the bonding force between the core wire 10 and the coating layer 20 and more reliably suppress the occurrence of cracking at the interface 20A of the coating layer 20 with the core wire 10.

Figure 7:
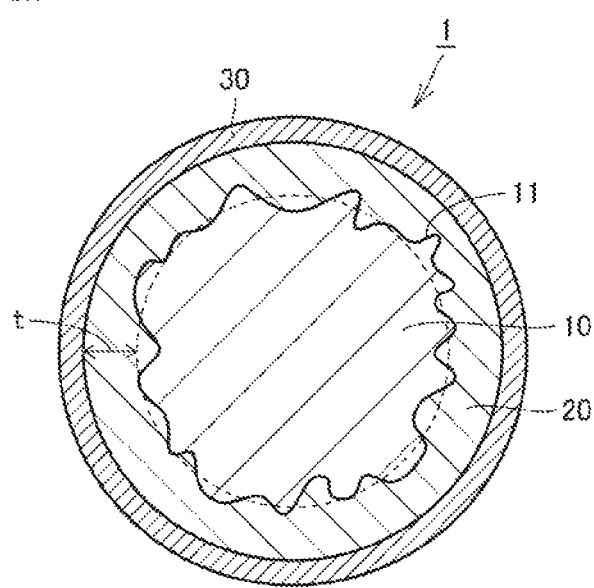
FIG. 7 is a schematic cross-sectional view showing a second modification of the copper-coated steel wire in Embodiment 1.

Next, a second modification of the copper-coated steel wire 1 in Embodiment 1 will be described. FIG. 7 is a cross-sectional view of the core wire 10 in its cross section perpendicular to the longitudinal direction. Referring to FIG. 7, the copper-coated steel wire 1 in the present modification includes a surface layer 30 disposed to include the surface of the copper-coated steel wire 1. The surface layer 30 includes at least one selected from the group consisting of a gold layer, a silver layer, a tin layer, a palladium layer, a nickel layer, and an alloy layer of these metals. Although the presence of the alloy layer 19 is not essential in the copper-coated steel wire of the present application, the inclusion of the surface layer 30 can improve the corrosion resistance, solderability, and conductivity on the surface of the copper-coated steel wire 1.

Embodiment 2

Figure 8:
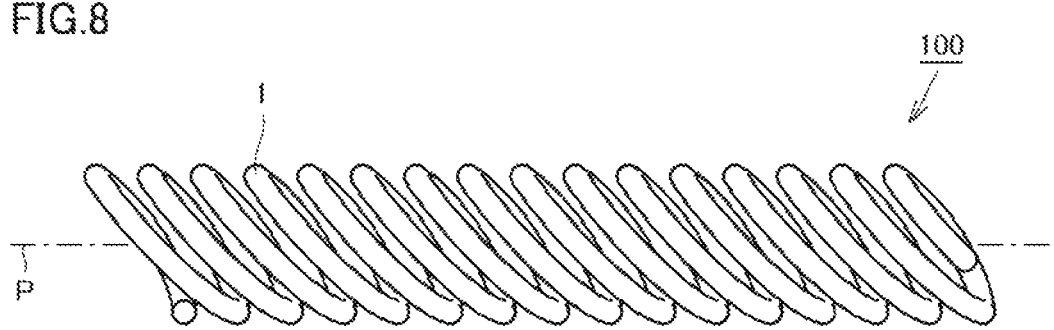
FIG. 8 is a perspective view showing the structure of a spring in Embodiment 2.

A description will now be made, as Embodiment 2, of an embodiment of a spring of the present disclosure. Referring to FIG. 8, a spring 100 in the present embodiment is made of the copper-coated steel wire 1 of Embodiment 1 described above. The spring 100 is a copper-coated steel wire 1 of the above-described Embodiment 1 coiled into a spring shape. The spring 100 in the present embodiment is a helical spring which has a structure in which the copper-coated steel wire 1 is wound inclined with respect to a plane perpendicular to the direction along a central axis P. The spring 100 in the present embodiment is a canted coil spring that is used such that a load is applied in a direction perpendicular to the axial direction. According to the spring 100 in the present embodiment, as being made of the above-described copper-coated steel wire, the occurrence of cracking at the interface 20A of the coating layer 20 with the core wire 10 can be suppressed, and the occurrence of corrosion in the core wire 10 can also be suppressed. It is therefore possible to provide a spring 100 that is excellent in durability. While the description was made in the present embodiment of the case where the spring 100 is a canted coil spring, it may be a spring that is used such that a load is applied in the axial direction of the spring 100.

Embodiment 3

Figure 9:
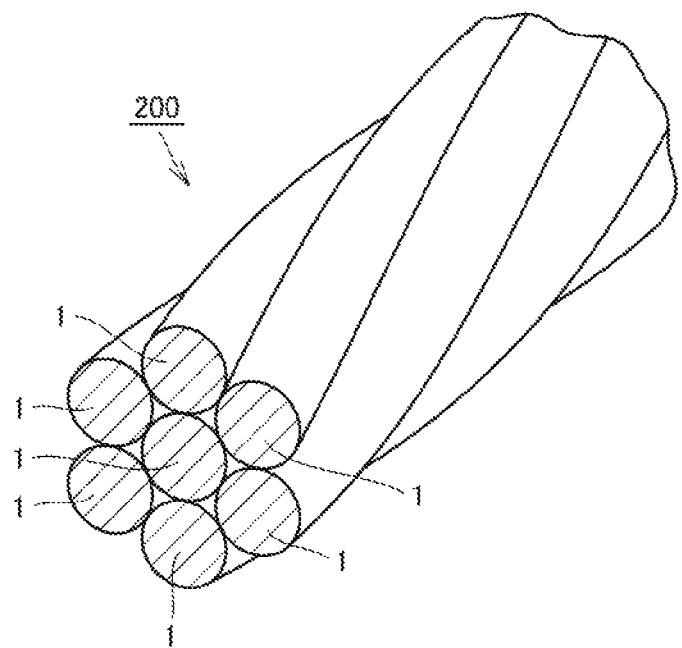
FIG. 9 is a perspective view showing the structure of a stranded wire in Embodiment 3.

A description will now be made, as Embodiment 3, of an embodiment of a stranded wire of the present disclosure. In FIG. 9, cross sections of copper-coated steel wires 1 perpendicular to the longitudinal direction are illustrated as well. Referring to FIG. 9, a stranded wire 200 in the present embodiment is composed of a plurality of the copper-coated steel wires 1 of the above-described Embodiment 1 twisted together. In the present embodiment, the stranded wire has a structure in which seven copper-coated steel wires 1 are twisted together. Each copper-coated steel wire 1 included in the stranded wire 200 is the copper-coated steel wire of the above-described Embodiment 1. With the stranded wire 200 in the present embodiment having the structure in which the copper-coated steel wires 1 of the above-described Embodiment 1 are twisted together, the occurrence of cracking at the interface 20A of the coating layer 20 with the core wire 10 can be suppressed, and the occurrence of corrosion in the core wire 10 can also be suppressed. It is therefore possible to provide a stranded wire 200 that is excellent in durability.

Embodiment 4

Figure 10:
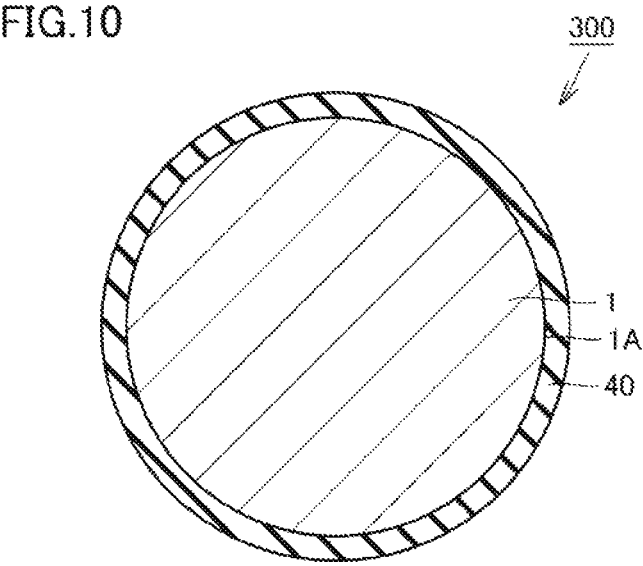
FIG. 10 is a schematic cross-sectional view showing the structure of an insulated electric wire in Embodiment 4.

A description will now be made, as Embodiment 4, of an embodiment of an insulated electric wire of the present disclosure. FIG. 10 is a cross-sectional view of a copper-coated steel wire 1 in its cross section perpendicular to the longitudinal direction. Referring to FIG. 10, an insulated electric wire 300 in the present embodiment includes the copper-coated steel wire 1 of Embodiment 1 described above, and an insulating layer 40 disposed to cover an outer periphery 1A of the copper-coated steel wire 1. According to the insulated electric wire 300 of the present disclosure, with it including the copper-coated steel wire 1 of the above-described Embodiment 1, the occurrence of cracking at the interface 20A of the coating layer 20 with the core wire 10 can be suppressed, and the occurrence of corrosion in the core wire 10 can also be suppressed. It is therefore possible to provide an insulated electric wire 300 that is excellent in durability. While the case of using the copper-coated steel wire 1 was described in the present embodiment, the wire is not limited thereto; the stranded wire 200 of Embodiment 3 may be used in place of the copper-coated steel wire 1.

Embodiment 5

Figure 11:
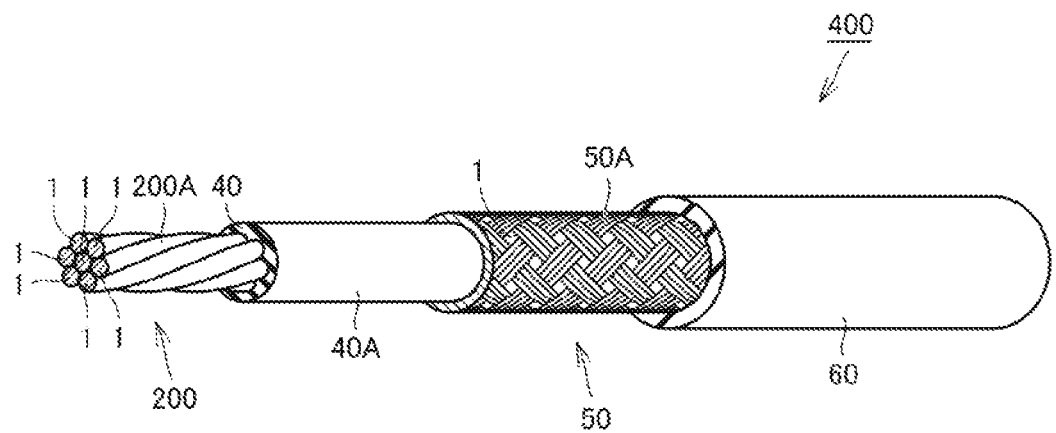
FIG. 11 is a schematic cross-sectional view showing the structure of a cable in Embodiment 5.

A description will now be made, as Embodiment 5, of an embodiment of a cable of the present disclosure. In FIG. 11, cross sections of stranded wire, insulating layer, shielding portion, and protective layer perpendicular to the longitudinal direction are illustrated as well. Referring to FIG. 11, a cable 400 includes the stranded wire 200 of Embodiment 3, an insulating layer 40 disposed to cover an outer periphery 200A of the stranded wire 200, a shielding portion 50 disposed to surround an outer peripheral surface 40A of the insulating layer 40, and a protective layer 60 disposed to cover an outer periphery 50A of the shielding portion 50. The shielding portion 50 includes a plurality of the copper-coated steel wires 1 of Embodiment 1 above. The shielding portion 50 in the present embodiment has a shape of the plurality of copper-coated steel wires 1 of the above-described Embodiment 1 woven together. According to the cable 400 of the present disclosure, with it having the structure including the stranded wire 200, the occurrence of cracking at the interface 20A of the coating layer 20 with the core wire 10 can be suppressed, and the occurrence of corrosion in the core wire 10 can also be suppressed. In addition, with the shielding portion 50 including a plurality of the above-described copper-coated steel wires 1, the durability of the shielding portion 50 can be improved. It is therefore possible to provide a cable 400 that is excellent in durability. Although the case of using the stranded wire 200 as a conductor portion was described in the present embodiment, the conductor portion is not limited thereto, the copper-coated steel wire 1 in Embodiment 1 may be used in place of the stranded wire 200. Further, while the case where the shielding portion 50 includes a plurality of copper-coated steel wires 1 was described, the configuration is not limited thereto; the shielding portion 50 may be composed of a wire material other than in the present embodiment. Furthermore, the conductor portion may be composed of a wire material other than in the present embodiment, and only the shielding portion 50 may include a plurality of the copper-coated steel wires 1 of the above-described Embodiment 1.

Examples

Experiments were conducted to investigate how the value of the arithmetic mean roughness Ra and the maximum cross-sectional height Rt of the core wire 10 with respect to the thickness of the coating layer 20 in a cross section perpendicular to the longitudinal direction affect the properties of the copper-coated steel wire 1. Firstly, the steps S10 to S50 of the above embodiment were performed to prepare a sample of the copper-coated steel wire 1. For the steel constituting the material steel wire prepared in step S10, SUS 304 was adopted. A sample A was thus obtained. The sample A had a wire diameter of 2 mm, a core wire diameter of 0.8 mm, and a coating layer thickness t of 200 μm. The value of Ra of the outer peripheral surface 1I of the core wire 10 in the sample A was 33% of the thickness t of the coating layer 20. The value of Rt of the outer peripheral surface 11 of the core wire 10 in the sample A was 58% of the thickness t of the coating layer 20.

Samples B to H were prepared which differed from the sample A in at least one of the diameter of the core wire 10, the thickness of the coating layer 20, the value of Ra of the outer peripheral surface 11 of the core wire 10, and the value of Rt of the outer peripheral surface 11 of the core wire 10. For comparison, samples I to L were prepared for which SWP-B was adopted as the material steel wire.

Figure 12:
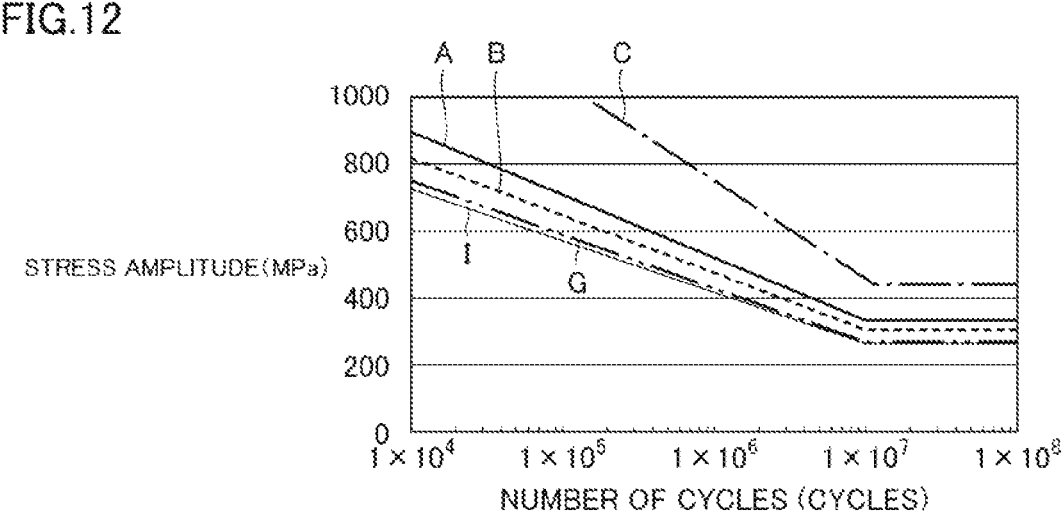
FIG. 12 shows the results of a fatigue strength test.
Figure 13:
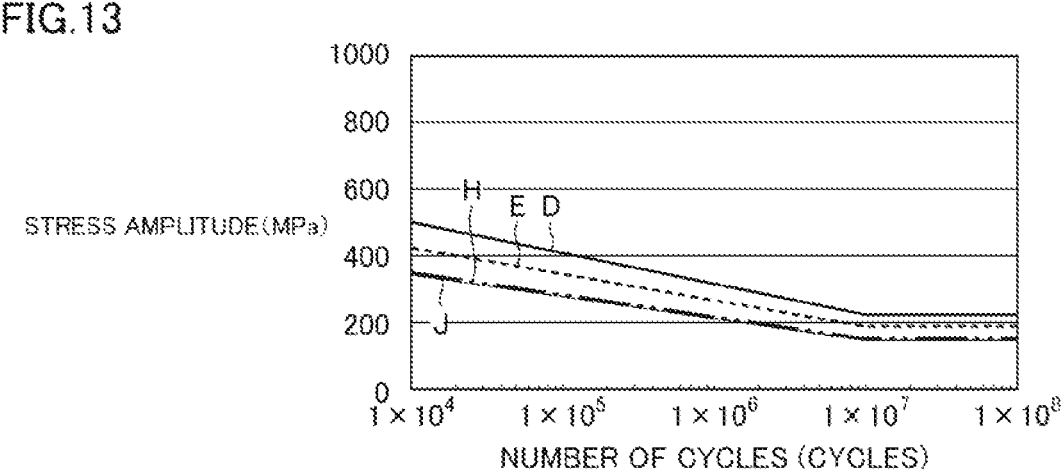
FIG. 13 shows the results of the fatigue strength test.
Figure 14:
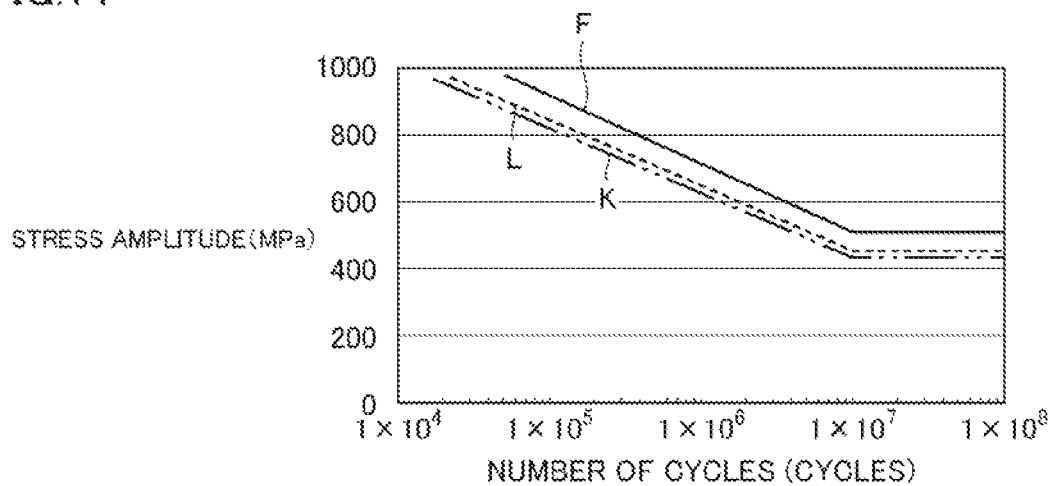
FIG. 14 shows the results of the fatigue strength test.
Figure 15:
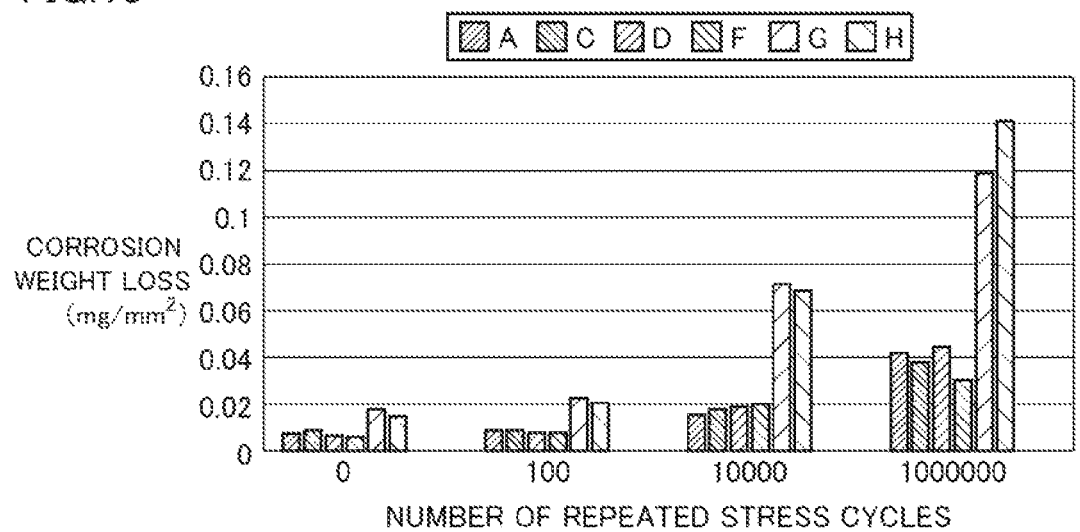
FIG. 15 shows a relationship between the number of repeated stress cycles and corrosion weight loss.

Next, the tensile strength was measured for the samples A to L. The measurement results are shown in Table 1. As a fatigue test, a Hunter fatigue test was conducted. FIGS. 12 to 14 are S-N diagrams showing the relationship between the number of stress cycles to breakage and the stress amplitude in the fatigue test. In FIGS. 12 to 14, the vertical axis represents stress amplitude, and the horizontal axis represents number of stress cycles. The stress amplitude is expressed in MPa. For each sample, a maximum stress amplitude at which the copper-coated steel wire 1 did not break even after $1 \times 10^7$ cycles of repeated stress in a fatigue test was measured. Further, on the samples A, C, D, F, G, and H, a fatigue test was conducted by repeatedly loading the above-described maximum stress amplitude. Then, corrosion weight loss was measured by spraying salt water on the samples that had undergone 100, 10000, or 1000000 cycles of repeated stress. The corrosion weight loss of each sample before being subjected to the fatigue test was also measured after spraying salt water. The salt water spraying was conducted in accordance with JIS Z 2371. FIG. 15 shows the relationship between the number of repeated stress cycles and the corrosion weight loss. FIG. 15 shows the corrosion weight loss of each sample when 0, 100, 10000, or 1000000 cycles of repeated stress were applied. In FIG. 15, the vertical axis represents corrosion weight loss, and the horizontal axis represents number of repeated stress cycles. The corrosion weight loss is expressed in $mg/mm^2$.

This is conceivably because the occurrence of cracking at the interface 20A of the coating layer 20 with the core wire 10 has been suppressed in the samples A to F having the percentages of Ra and Rt within the above-described ranges. Further, referring to FIG. 15, as to the corrosion weight loss, the increase in corrosion weight loss is suppressed in the samples A, C, D, and F having the percentages of Ra and Rt within the above-described ranges, as compared to the samples G and H having the percentages of Ra and Rt falling outside the above-described ranges. This is more remarkable with an increasing number of repeated stress cycles.

The above experimental results demonstrate that according to the copper-coated steel wire 1 of the present disclosure, it is possible to provide a copper-coated steel wire that is capable of suppressing the occurrence of cracking at the interface 20A of the coating layer 20 with the core wire 10 and also suppressing the occurrence of corrosion in the core wire 10.

It should be understood that the embodiments and examples disclosed herein are illustrative and non-restrictive in every respect. The scope of the present disclosure is defined by the terms of the claims, rather than the description above, and is intended to include any modifications within the scope and meaning equivalent to the terms of the claims.

DESCRIPTION OF REFERENCE NUMERALS

1: copper-coated steel wire; 1A, 50A, 200A: outer periphery; 10: core wire; 11, 40A: outer peripheral surface; 19: alloy layer; 20: coating layer; 20A: interface; 30: surface layer; 40: insulating layer; 50: shielding portion; 60: protective layer; 90: material steel wire; 91: surface; 100: spring; 200: stranded wire; 300: insulated electric wire; 400: cable; P: central axis; t: thickness; and A, B, C, D, E, F, G, H, I, J, K, L: sample.

The invention claimed is:
1. A copper-coated steel wire comprising:
   a core wire made of a stainless steel; and

TABLE 1

|  | Steel Grade | Wire Diameter (mm) | Core Wire Diameter (mm) | Coating Layer Thickness (μm) | Percentage of Arithmetic Mean Roughness Ra (%) | Percentage of Maximum Cross-Sectional Height Rt (%) | Tensile Strength (MPa) |
| --- | --- | --- | --- | --- | --- | --- | --- |
| Sample A | SUS304 | 1 | 0.8 | 200 | 33 | 58 | 1440 |
| Sample B | SUS304 | 1 | 0.8 | 200 | 27 | 53 | 1450 |
| Sample C | SUS304 | 0.5 | 0.45 | 75 | 45 | 102 | 1980 |
| Sample D | SUS304 | 0.25 | 0.18 | 35 | 75 | 180 | 1160 |
| Sample E | SUS304 | 0.25 | 0.18 | 35 | 34 | 45 | 1170 |
| Sample F | SUS304 | 0.1 | 0.085 | 7.5 | 57 | 132 | 2015 |
| Sample G | SUS304 | 1 | 0.8 | 200 | 21 | 32 | 1470 |
| Sample H | SUS304 | 0.25 | 0.18 | 35 | 92 | 320 | 1155 |
| Sample I | SWP-B | 1 | 0.8 | 200 | 18 | 40 | 1520 |
| Sample J | SWP-B | 0.25 | 0.18 | 35 | 12 | 32 | 1170 |
| Sample K | SWP-B | 0.1 | 0.085 | 7.5 | 15 | 39 | 7025 |
| Sample L | SWP-B | 0.05 | 0.042 | 4 | 9 | 25 | 2220 |

Referring to Table 1, it is confirmed that as to the tensile strength, the samples A to F, having the percentage of Ra within the range of 25% or more and 90% or less and the percentage of Rt within the range of 45% or more and 300% or less, exhibit the values of 300 MPa or more and 3400 MPa or less, which is an appropriate range. Referring to FIGS. 12 to 14, as to the maximum stress amplitude, the samples A to F clearly surpass the samples G to L having the percentages of Ra and Rt falling outside the above-described ranges.

a coating layer made of copper or a copper alloy and covering an outer peripheral surface of the core wire;
   a thickness of the coating layer being not less than 7.5 μm and not more than 200 μm, and
   in a cross section perpendicular to a longitudinal direction of the core wire, the outer peripheral surface of the core wire having a value of an arithmetic mean roughness Ra of not less than 30% and not more than 60% of a thickness of the coating layer.

2. The copper-coated steel wire according to claim 1, wherein in the cross section perpendicular to the longitudinal direction of the core wire, the outer peripheral surface of the core wire has a value of a maximum cross-sectional height Rt of not less than 45% and not more than 300% of the thickness of the coating layer.

3. The copper-coated steel wire according to claim 1, wherein the steel constituting the core wire is a ferritic stainless steel.

4. The copper-coated steel wire according to claim 1, wherein the steel constituting the core wire is an austenitic stainless steel.

5. The copper-coated steel wire according to claim 4, wherein the austenitic stainless steel has a component composition satisfying the following expression (1):

$$-400 \geq 1032 - 1667 \times (A+B) - 27.8 \times C - 33 \times D - 61 \times E - 41.7 \times F \quad \text{[Math. 1]}$$

where A represents a carbon content [mass %], B represents a nitrogen content [mass %], C represents a silicon content [mass %], D represents a manganese content [mass %], E represents a nickel content [mass %], and F represents a chromium content [mass %].

6. The copper-coated steel wire according to claim 1, wherein the coating layer has an alloy layer disposed in a region including an interface with the core wire, the alloy layer containing an alloy of nickel and a metallic element contained in the steel constituting the core wire.

7. The copper-coated steel wire according to claim 1, having a tensile strength of not less than 300 MPa and not more than 3400 MPa.

8. The copper-coated steel wire according to claim 1, further comprising a surface layer disposed to include a surface of the copper-coated steel wire, the surface layer including at least one selected from the group consisting of a gold layer, a silver layer, a tin layer, a palladium layer, a nickel layer, and an alloy layer of these metals.

9. A spring made of the copper-coated steel wire according to claim 1.

10. A stranded wire comprising a plurality of the copper-coated steel wires according to claim 1 twisted together.

11. An insulated electric wire comprising:
the stranded wire according to claim 10; and
an insulating layer disposed to cover an outer periphery of the stranded wire.

12. A cable comprising:
the stranded wire according to claim 10;
an insulating layer disposed to cover an outer periphery of the stranded wire; and
a shielding portion disposed to surround an outer peripheral surface of the insulating layer.

13. An insulated electric wire comprising:
the copper-coated steel wire according to claim 1; and
an insulating layer disposed to cover an outer periphery of the copper-coated steel wire.

14. A cable comprising:
a conductor portion of a wire shape;
an insulating layer disposed to cover an outer peripheral surface of the conductor portion; and
a shielding portion disposed to surround an outer peripheral surface of the insulating layer,
the shielding portion including a plurality of the copper-coated steel wires according to claim 1.

15. A cable comprising:
the copper-coated steel wire according to claim 1;
an insulating layer disposed to cover an outer periphery of the copper-coated steel wire; and
a shielding portion disposed to surround an outer peripheral surface of the insulating layer.

16. The cable according to claim 15, wherein the shielding portion includes a plurality of the copper-coated steel wires according to claim 1.

17. A copper-coated steel wire comprising:
a core wire made of a stainless steel; and
a coating layer made of copper or a copper alloy and covering an outer peripheral surface of the core wire;
a thickness of the coating layer being not less than 7.5 μm and not more than 200 μm, and
in a cross section perpendicular to a longitudinal direction of the core wire, the outer peripheral surface of the core wire having a value of a maximum cross-sectional height Rt of not less than 45% and not more than 300% of a thickness of the coating layer.

18. A copper-coated steel wire comprising:
a core wire made of a stainless steel; and
a coating layer made of copper or a copper alloy and covering an outer peripheral surface of the core wire;
a thickness of the coating layer being not less than 7.5 μm and not more than 200 μm,
in a cross section perpendicular to a longitudinal direction of the core wire, the outer peripheral surface of the core wire having a value of an arithmetic mean roughness Ra of not less than 25% and not more than 90% of a thickness of the coating layer,
in the cross section perpendicular to the longitudinal direction of the core wire, the outer peripheral surface of the core wire having a value of a maximum cross-sectional height Rt of not less than 45% and not more than 300% of the thickness of the coating layer,
the steel constituting the core wire being an austenitic stainless steel,
the coating layer having an alloy layer disposed in a region including an interface with the core wire, the alloy layer containing an alloy of nickel and a metallic element contained in the steel constituting the core wire, and
the copper-coated steel wire having a tensile strength of not less than 300 MPa and not more than 3400 MPa.

* * * * *